United States Patent [19]

Schnittker et al.

[11] Patent Number: 5,586,313

[45] Date of Patent: Dec. 17, 1996

[54] METHOD FOR UPDATING A FILE

[75] Inventors: William L. Schnittker, Naperville; Andrew L. Ottens, Rolling Meadows; Frank Ott, Lockport; David Berry, Naperville, all of Ill.

[73] Assignee: L.I.D.P. Consulting Services, Inc., Woodridge, Ill.

[21] Appl. No.: 17,118

[22] Filed: Feb. 12, 1993

[51] Int. Cl.⁶ .................... G06F 7/06; G06F 7/20
[52] U.S. Cl. ............. 395/615; 395/575; 364/401 R; 364/413.01; 235/375; 235/379
[58] Field of Search ............... 395/600, 575; 235/379, 375; 364/401, 413.01

[56]   References Cited

U.S. PATENT DOCUMENTS

| | | | |
|---|---|---|---|
| 4,025,760 | 5/1977 | Trenkamp | 235/61.78 |
| 4,491,725 | 1/1985 | Pritchard | 235/375 |
| 4,674,042 | 6/1987 | Hernandez et al. | 364/401 |
| 4,674,043 | 6/1987 | Hernandez et al. | 364/401 |
| 4,831,526 | 5/1989 | Luchs et al. | 364/401 |
| 4,885,785 | 12/1989 | Reynolds et al. | 382/8 |
| 4,916,611 | 4/1990 | Doyle, Jr. et al. | 364/401 |
| 5,010,238 | 4/1991 | Kadono et al. | 235/379 |
| 5,070,452 | 12/1991 | Doyle, Jr. et al. | 364/401 |
| 5,095,429 | 3/1992 | Harris et al. | 364/408 |
| 5,134,564 | 7/1992 | Dunn et al. | 364/406 |
| 5,136,502 | 8/1992 | Van Remortel et al. | 364/413.01 |
| 5,333,303 | 7/1994 | Mohan | 395/575 |

*Primary Examiner*—Thomas G. Black
*Assistant Examiner*—Cheryl R. Lewis
*Attorney, Agent, or Firm*—Olson & Hierl, Ltd.

[57]   ABSTRACT

A method is disclosed for retroactively inserting a transactional change into a file where the file involves a plurality of images that are recorded (i.e., saved) at preset sequential time intervals. Each image contains all pertinent information relating to the file subject matter, such as an insurance policy or the like, existing at the time of its saving. The image which immediately precedes the effective date of the desired retroactive transactional change is retrieved, updated to the effective date, and then subjected to the program sequences of backing out, applying and reapplying. The resulting corrected image overcomes the prior art processing problems of prorating, policy cancellation and foreign record origin for a file.

13 Claims, 14 Drawing Sheets

METHOD FOR UPDATING A FILE

FIELD OF THE INVENTION

The present invention relates to a method for updating a file, and, more specifically, to a computerized method for entering a retroactive transactional change into a file by the forward-based alteration of previous transactions.

BACKGROUND OF THE INVENTION

Many types of individual files require updating of record information contained therein, such as insurance policy files, credit information files, bank accounts, loan records, payroll records, and the like. Changing particular information in a file can result in the need to make additional changes in other information contained in a file, such as changes relating to actions that are taken based upon information in the file.

For example, the record information pertaining to individual insurance policies of a policy class is commonly maintained by an insurer in files (typically, one file per policy). Each file on a policy must be amended continuously to record changes in various informational items, such as, for example, premium notices, premium payments, policy cash value, status of any loan against the policy, any change in policy terms, agent commission payments due or payable, and the like. A change in one policy item, such as the amount of the premium due or paid, or the like, can generate changes in other policy items, such as, for example, in policy terms or in agent commission payments.

Certain informational changes in particular items must, in effect, be entered retroactively. In, for instance, the case of an insurance policy file, examples of retroactively entered record changes can include policy terms, correction of errors entered previously, various financial matters, and the like.

Previously, in the prior art, to enter a change retroactively into a policy file, the insurer was required to undertake the laborious process of first retracing and negating all items in the file pertaining to a retroactive information change in an item proceeding first back in time to the effective or proper date for the retroactive change, then entering the retroactive change, and finally reentering and updating all the negated items in the forward direction. Because of the amount of time and labor involved in entering retroactive transactional changes into an insurance policy file using conventional procedures, a computerized system for entering retroactive information would be desirable.

In one presently preferred prior art system for computerized maintenance and administration of insurance policy files which is identified as "The Administrator", a permanent file record of each policy is created initially. Previously, in "The Administrator" system, the file creation time corresponded either to the effective policy date or to the date when an old and different file maintenance system file was converted to "The Administrator" system. Conveniently and preferably in "The Administrator" system, the file issue record of each policy is entered on a (computerized) form that is common to all policies of a given policy class.

As used herein, the term "date" refers to the calendar date plus clock time, unless otherwise indicated.

The prior "The Administrator" system, in addition to the initial issue record file, also maintains a single working record image of each active insurance policy. Each such image preferably in a form similar to that used for the file issue record except that the single working record image has recorded therein all information (i.e. accounting record) relating to any changes in the policy occurring after the file creation date (including any retroactive transactional changes that have occurred in that policy) up to the present date.

In addition, a plurality of time spaced stored images are also maintained for each file. These latter stored images which are each periodically generated (recorded) from a current embodiment of the working record image as it exists at the time as of each individual stored time spaced image's recordation date.

As used herein, the term "transactional change" refers to any quantitative informational change pertaining to a policy, such as information change of a character as above indicated, involving addition, deletion, alteration, amendment, error correction, or the like. In connection with a transactional change, the term "retroactive" means that the change is effective or intended to be effective as of a date that is termed the "effective date". The effective date always occurred prior to the present date.

In other words, at each particular user-selected date, the working record of each policy is recorded (i.e., "saved") in the form of a retrievable single document or "image" that is comparable to a photographic "snapshot". Thus, an individual image of a working record file provides the complete status of a policy at the image recordation date. For each policy file, a plurality of images exist that are individually successively recorded at respective spaced, user-selected time intervals.

As used herein, the term "policy image" or "image" refers to the complete data and information pertaining to a particular policy at a given time.

Also in "The Administrator" system, a companion historical file is maintained for each individual insurance policy file in addition to the image plurality. Each historical companion file stores, by date, and over a time interval, every accounting transaction information relating to a policy file. The transaction information forms depend on the type of transaction information involved, such as a financial transaction, a maintenance transaction, an accounting record, or the like.

In addition, the term "financial transaction" refers to a transaction which involves a sum of money that is being applied towards the monetary value(s) of an insurance policy.

As used herein, the term "maintenance transaction" refers to a transactional change involving an insurance policy which affects only future or current policy information processing and does not affect any policy information processing which pre-dates the maintenance transaction.

Moreover, the term "accounting record" refers to either a financial transaction or a maintenance transaction for an insurance policy. If an accounting record is a maintenance transaction, then the system accesses an image of that maintenance.

The companion historical file is in effect a subfile relating to a particular insurance policy which subfile holds all quantitative information concerning that policy.

In this prior "The Administrator" policy maintenance system, when a particular retroactive transactional change is to be entered into the policy working file, the policy image which immediately precedes the effective date of the desired retroactive transactional change is retrieved. All accounting records and maintenance transactions existing in the companion historical file which occurred between the effective date of the retroactive transactional change and the date of the so retrieved policy image are now entered into the retrieved image. Thus, the resulting image of the retrieved file establishes the file policy retroactively in the form that it existed at the effective date of the desired retroactive transactional change. The resulting image is thus converted to an intermediate image.

Next, a so-called "backout" is performed on the resulting image. In the prior "The Administrator" system backout, all transactional changes which occurred during the time period extending from the effective date of the desired retroactive transactional change to the present date were effectively negated. The backout is performed with all arithmetic signs reversed.

As used herein with reference to "The Administrator" system as it previously existed, the term "backout", "backing out", "backed out", or equivalent refers to the processing of adjusted information (usually quantitative in nature) into a file pertaining to a policy which information was entered into a companion historical file and processed on an image in the time period extending from the effective date of a desired retroactive transactional change to the present date. Since the backout is carried out with reverse arithmetic signs, each and every financial transaction or maintenance transaction which occurred in this time period in the file is negated.

Next, when the backout is completed, the desired retroactive transactional change is applied to the resulting intermediate image (using the correct mathematical sign) and accordingly, the intermediate image is thus converted to an adjusted image.

As used herein, the term "apply", "application" or the equivalent refers to the processing (i.e., entering) into an image either a financial transaction or a maintenance transaction record involving the policy that is covered by this file. The apply processing step subroutine is always current which means that a backout has been performed and that a reapply is not in progress.

Thereafter, when the application is completed, any and all of the subsequent transactional changes in a policy that occurred after the effective date of the particular retroactive transactional change and that were previously entered into the file policy are reapplied in the adjusted image using the correct arithmetic signs.

As used herein, the term "reapply" refers to the processing (i.e., entering) into a file any and all financial activity and administrative maintenance involving the policy that is covered by the file. The reapply processing step subroutine is practiced after a backout and an apply.

The adjusted image is thus converted to a corrected image that fully and properly incorporates the desired retroactive transactional change. This corrected image is now the working record image from which the policy will be administered.

The successive step combination of the reversed sign backout, the application and the reapplication results in entering a retroactive transactional change into a selected retrieved image file and processing this image to produce the corrected image. The corrected image now becomes the working record image, which constitutes a file that has the same status or state that a currently produced file would have had if the desired, retroactive transactional change had been made on a timely basis at the effective date of such desired retroactive transactional change. In addition, all transactional changes that occurred after the effective date of the desired retroactive transactional change, such as, for example, commission payments, policy changes, and the like are automatically corrected.

The basic principle of this procedure is that all calculations are performed in the forward direction in time which simplifies all calculations.

Although promising in some of its aspects, this prior art insurance policy file maintenance system suffered various severe disadvantages. For one thing, this prior art system was unable to process suspended insurance policies. For another thing, this prior art system was unable to prorate a calculation so as to provide the capacity to deal with such matters as policy suspension, policy cancellation, agent commissions or the like. For another thing, this prior art system did not have the ability to utilize and convert policy data existing in an earlier policy file maintenance systems into a policy file such as is employed in the present system. These disadvantages have substantially limited the utility and practical usability of this prior art system.

The art needs a new and improved computerized forward-based method that can be used in combination with this prior art "The Administrator" system and which overcomes these disadvantages. The present invention provides such a method.

SUMMARY OF THE INVENTION

The present invention provides an improved method for entering a retroactive transactional change into a record file, preferably an insurance policy file, from an effective date to a selected target date which can be a date earlier than the present date.

The inventive method is used in combination with the above-indicated prior art method for computerized file maintenance that uses forward direction calculations. However the inventive method overcomes the above-indicated disadvantages associated with the prior art method. Thus, the present method avoids the limitation on forward calculations only to the present date. In addition, the present methods permits pro rata computations of financial transactions. Further the present method permits conversion of previous file information into the present system.

The present method makes possible the widespread and practical commercial utilization of the above-indicated computerized prior art file maintenance system.

The present invention is particularly well adapted for use in a computerized file system such as hereinabove characterized which incorporates the combination of (a) successively periodically stored images, and (b) companion historical files.

While a starting file that is stored in a computerized memory form and that is to undergo a retroactive transactional change can be in various forms, for purposes of practicing the method of this invention, a present preference is to employ a retrievable starting file that has a known date of recordation and that is in the image form.

To carry out the entry of a desired retroactive transactional change into a starting image in accordance with the present invention, the same process step sequence indicated above of starting image retrieval, conversion to a resulting image, backout to an intermediate image, application to an adjusted image, and reapplication to a corrected image is advantageously utilized. However, the backout automatically extends to either the present date, or to an intermediate target date. For example, the target date can be the date that a policy suspension went into effect.

In addition, during the application and reapplication procedures, calculations are preferably carried out on a pro rata basis. Thus, the corrected working record image produced not only incorporates the desired retroactive transactional change, but also optionally overcomes two of the above-identified disadvantages of the prior art process (the inability to back out to an intermediate target date and the inability to pro-rate accounting records into two separate transactions).

In addition, the present invention also provides the process capacity to convert policy data existing in the file on an individual insurance policy that is found in another and previous prior art system (relative to the image system preferably used in the practice of the present invention for computerized insurance policy maintenance) for use in the present system.

Thus, the process of the present invention for entering a retroactive transactional change into a file is applicable to such a prior art system by merely converting the policy file of the prior system into a working record image and a stored issue image, both current as of the date of conversion, such as is preferred for use in the practice of this invention. Thereby, the utility of the present invention is greatly enhanced. As a result, the third disadvantage associated with the existing prior art system (the inability to convert another file into a file of the present system by computer processing) is overcome.

It is a feature and advantage of the process of the present invention that the processing of the present invention can be cooperatively used and incorporated into the existing prior art system to produce a new combination. Thus, the need to create a completely new system that avoids the indicated prior art disadvantages is obviated, thereby saving substantial time and expense in research and development.

Also, the present invention provides the feature that one can upgrade an existing embodiment of the above described prior art file maintenance system in a simple and reliable manner, thereby avoiding the trouble and expense of system replacement to avoid the indicated prior art disadvantages.

Other and further objects, aims, purposes, features, advantages, embodiments, applications, and the like will be apparent to those skilled in the art from the present description taken with the accompanying drawings and the appended claims.

DETAILED DESCRIPTION (a) Computer System

Many different computer systems can be used in the practice of this invention, as those skilled in the art will readily appreciate. Such a computer system can range in capacity from a relatively simple microcomputer system, such as one that comprises a computer disk drive, a keyboard, a monitor and includes a memory means, such as might be suitable for a small office, up to a sophisticated mainframe-based computer system which utilizes a number of workstations to input information (including data) into a number of individual files, and also to retrieve information from, or pertaining to, these individual files.

In general, a computer system for use in the practice of this invention includes a central processing unit (CPU) which is adapted to accomplish the execution of each program step of the present invention. A suitable CPU can comprise, for example, individual chips, such as one of the Intel Corporation 8086, 80226, 80386 or 80486 chip series, a number of chips operating in tandem such as exist, for example, in supercomputer technology, and the like.

Memory means is included to store the program instructions which are executed by the CPU. Examples of suitable CPU associatable memory means include the random access memory (RAM) such as is commonly associated with the CPU, magnetic disk drives, or the like.

Memory means for storing file information (including data) is also provided. Examples of suitable CPU associatable such memory means include magnetic disk drives, compact disc-read only memory (CD-ROM) units, and the like.

Means for outputting data is also included. Examples of suitable CPU associatable data outputting means include printers, monitors, and the like.

Means for inputting information (including data) is also provided. Examples of suitable data inputting means include CPU associatable keyboards, magnetic disk drives, CD-ROM disks, modems, print scanners, touch screens, and the like.

The actual system components comprising a given computer system are a matter of individual choice with the chosen components in coacting combination being suitable to meet the needs of a particular application for the present invention.

The preferred embodiment of the invention that is described below is adapted to retroactively insert transactional changes into individual insurance policy files. However, the principles and processing steps of the present invention can be adapted to retroactively insert transactional changes into individual files of a wide variety of computer filing systems and the invention is not limited to the specific file administration system described herein.

(b) Method of This Invention Illustrated

Figure 1:
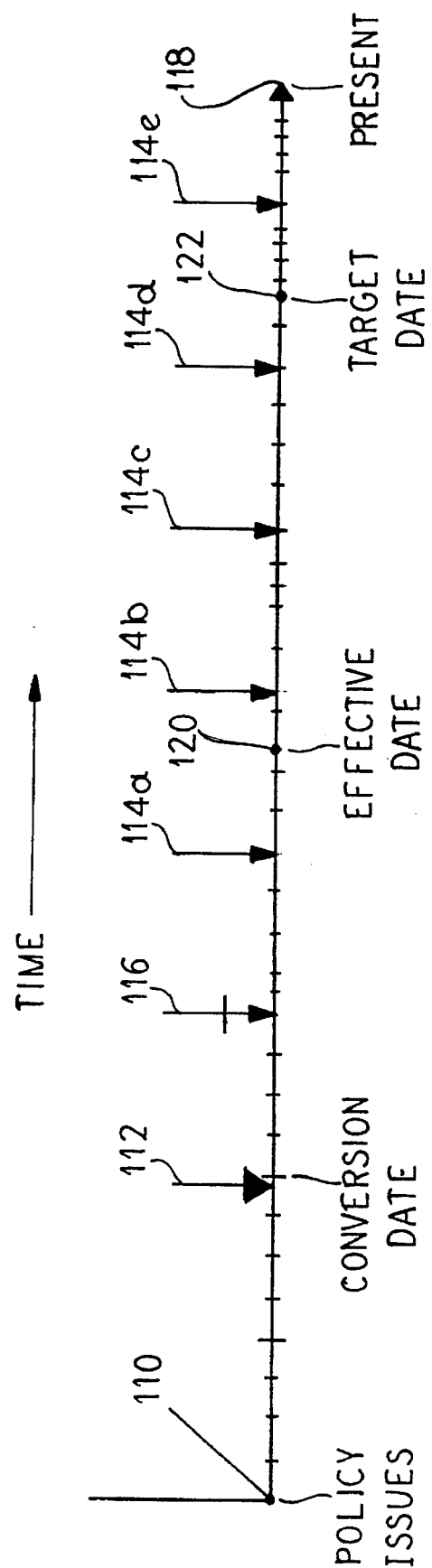
FIG. 1 presents diagramically an illustration of the features, operations and advantages of the present invention.

Principles of the present invention are illustrated in FIG. 1 where a time line 120 for an exemplary insurance policy is presented. Time progresses from left to right along time line 120. The exemplary policy on its issue date 110 was filed in some other administrative file system and is subsequently converted on a conversion date 112 to the present system by the use and application of the present invention as herein described and shown, for example, in FIG. 12.

In the prior "The Administrator" system, to convert an existing policy required laborious entry of all information from the issue date 110 to its date of conversion 112. In the present inventive system, the user creates a working record image and an issue record image of the policy as of the date of conversion 112 (as taught herein). The working record image can then be manipulated in the current system while the issue record image is the first stored image for use in entering retroactive transactional changes into the file.

The date of conversion is a user selected date which generally corresponds to the actual date the new system is first used. However, a user does have the option of using any date desired between the actual date of first use and the original issue date of the policy.

In FIG. 1, illustratively the user has elected the number of previously saved policy images to be five (marked sequentially as 114a, 114b, 114c, 114d and 114e. Thus, in FIG. 1, one policy image 116 has already been deleted to maintain the user selected number of images saved at five.

In the FIG. 1 illustration, a retroactive transactional change is being added to the policy as of an effective date 120. To do so, the system initially establishes (see FIG. 2, block 2) the policy in the image form in which it would have existed on the effective date 120.

Figure 4:
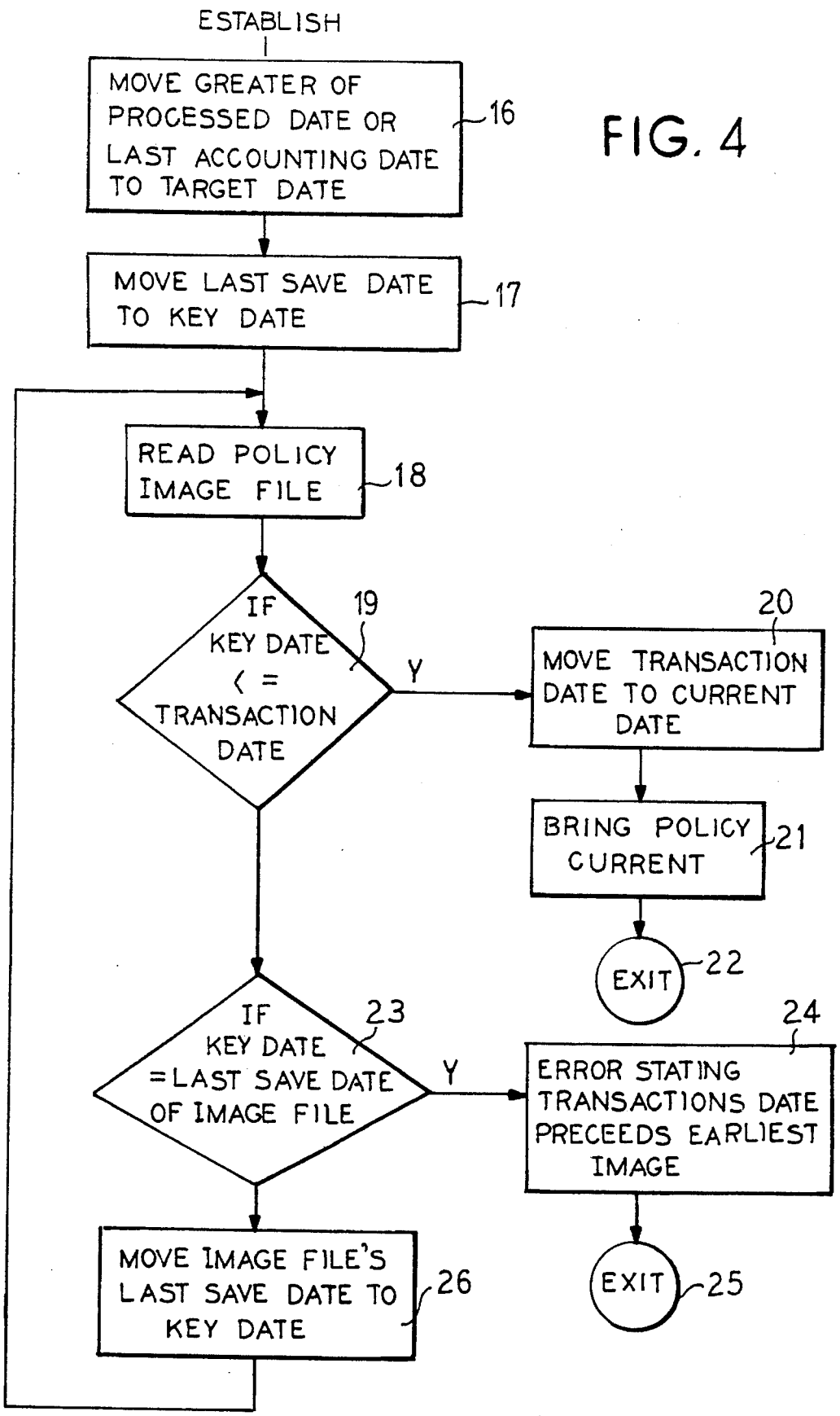
FIG. 4 is a flowchart presenting the presently preferred "establish" subroutine for use with the preferred program embodiment shown in FIGS. 2 and 3.

To establish the policy in this form, the program process first retrieves the policy image 114a which immediately precedes the effective date 120 (see FIG. 4, blocks 16–19, 23, 26). As in the prior "The Administrator" system, the policy image 114a contains all information relating to the status of the policy file as of its date of recordation. All transactions which occurred between the policy issue date 110 and the image recordation date of image 114a are taken into account in the image 114a.

In addition, the companion historical file of this insurance policy contains a record of all accounting transactions relating to the policy. In the presently preferred embodiment, this companion historical file is divided into two separate files, one handling all financial transactions, the second handling all policy maintenance transactions both of which terms being as defined above.

The program process next uses the "bring policy current" subroutine (see FIG. 4, blocks 20–21 and FIGS. 5 and 6) to put the policy in the form in which it would have existed at the time of the effective date 120. To do so, this subroutine sets the effective or transaction date equal to the current date (see FIG. 4, block 20) and then processes all relevant information existing in and obtained from the companion historical file which information occurred between the image 114a recordation date and the effective date 120 (see FIGS. 5 and 6, blocks 29–31, 36–41).

Thus, a resulting image is produced which represents the file status that existed as of the effective date 120. The next program process step sequence is to backout all transactions which occurred between the effective date 120 and a target date 118 (see FIG. 2, block 5 and FIG. 7).

In the prior "The Administrator" system, the backout step sequence and the reapply step sequence (as described herein) proceeded only to the present date. As a consequence, if a policy suspension or the like in the policy as of a particular target date that was prior to the present date, the prior system could not handle that policy suspension and would process any transactions which were scheduled to occur between the target date 122 and the present 118. This was despite the fact that such transactions would not have occurred due to the policy suspension as of the target date 122.

Many situations arise in the administration of insurance policies where the entering of a retroactive transactional change must not proceed from the effective date entirely forward to the present date. The processing must stop at a predetermined date termed herein for convenience the target date. The use of a target date is useful in such policy suspension situations as ownership change, divorce, pending death verification claim, program problems, changes to or halting of one or more automatic transactional entries, requests originating externally or internally for particular matters relating to a given policy and the like.

The present invention supplies a long felt need in the art for a selectable target date which occurs at a date in the time period extending from the effective date to the present date. By providing the capability for selecting a target date and for entering transactional changes to this date, the usefulness of "The Administrator" program is greatly improved and extended.

Figure 5:
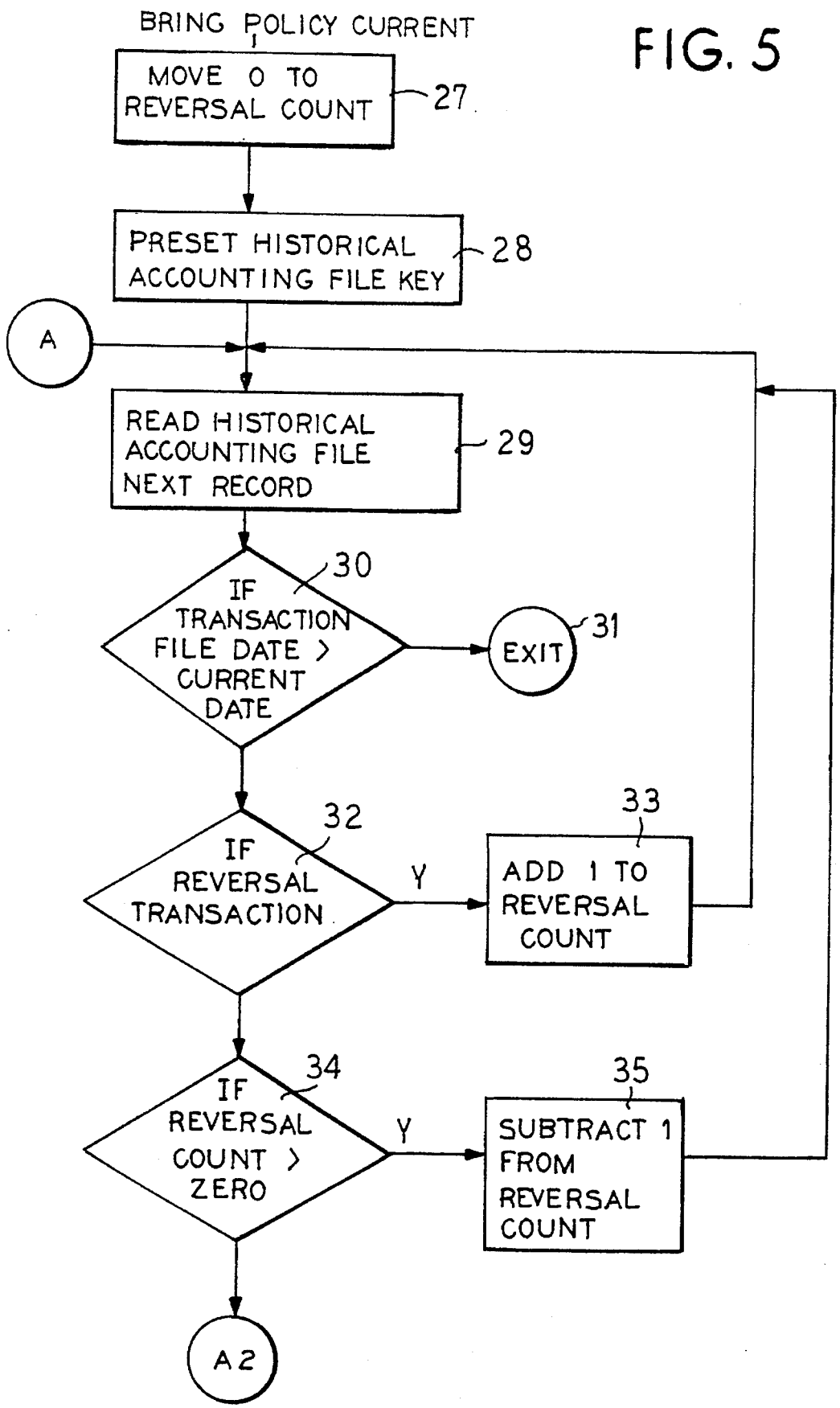
FIGS. 5 and 6 in combined form are a flowchart presenting the presently preferred "bring policy current" subroutine for use with the preferred program embodiment shown in FIG. 4 (see also FIGS. 7, 8, and 11)
Figure 6:
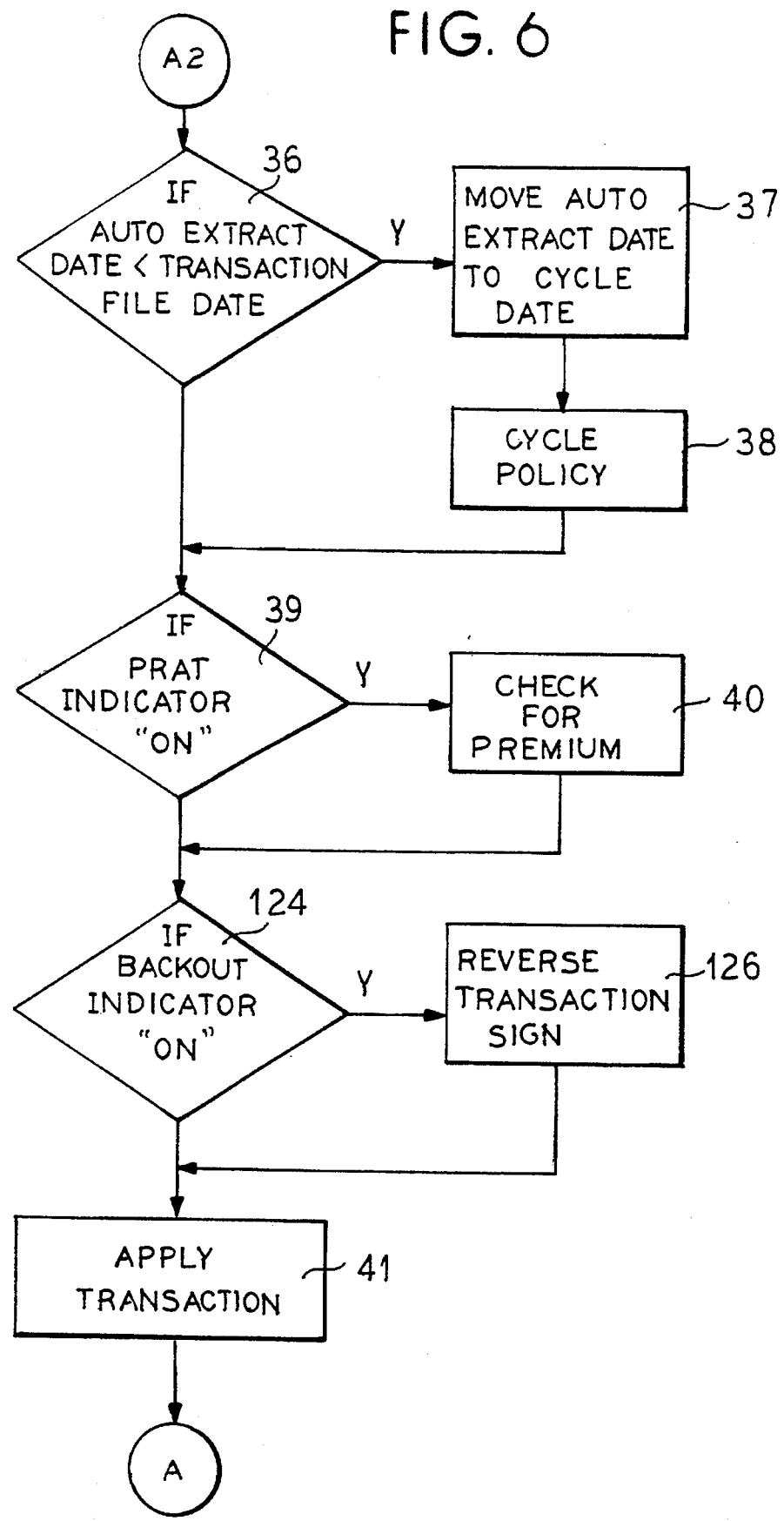
Figure 7:
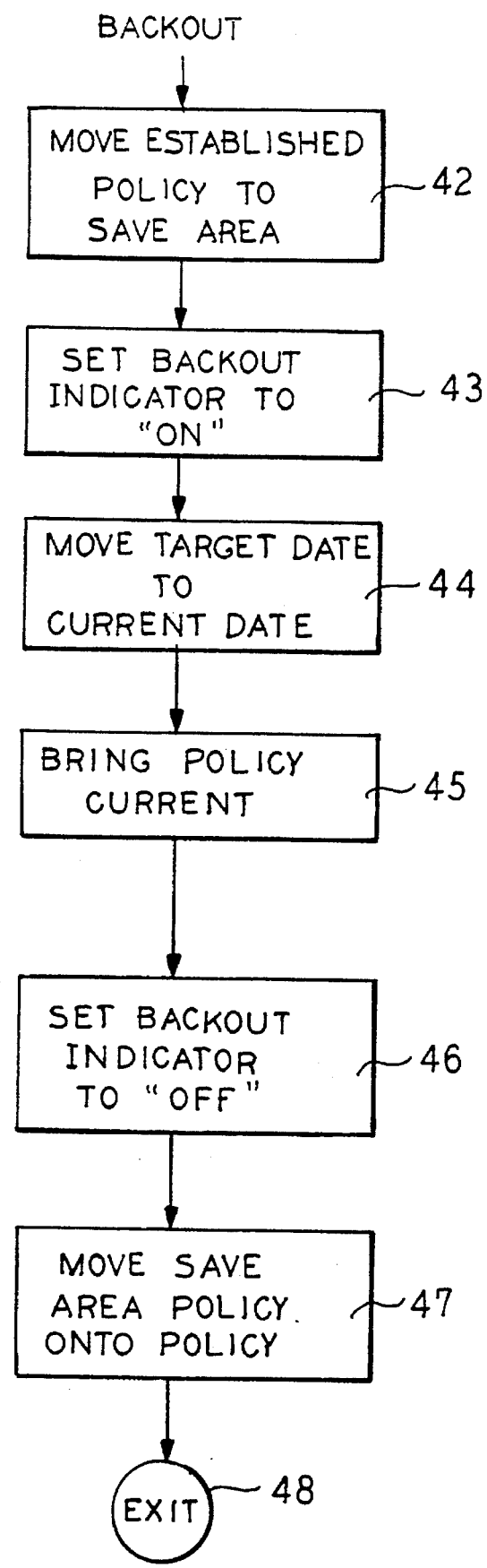
FIG. 7 is a flowchart presenting the presently preferred "backout" subroutine of the preferred program embodiment shown in FIGS. 2 and 3.

In this embodiment the present invention, the system moves the target date 122 to the current date (see FIG. 7, block 44), and sets the backout indicator to "on" (see FIG. 7, block 43) before using the bring policy current subroutine (see FIG. 7, block 45 and also FIGS. 5 and 6). Thus, only relevant accounting transactions which interveningly occurred between the effective date 120 and the target date 122 are processed in the backout subroutine.

The "bring policy current" subroutine applies the relevant transactions which were interveningly entered between the effective date 120 and the target date 118, but reverses all arithmetic signs (see FIG. 6, blocks 124, 126). The reversed signs obviate the interveningly entered transactions. The policy is thus put in the form in which it existed just prior to the effective date 120.

Next, the retroactive transaction change is applied to the resultant image (see FIG. 2, block 6) as of the effective date 120. The resulting adjusted image is now in the state in which it would have existed on the effective date 120 if the retroactive transactional change had been applied on a timely basis.

Figure 3:
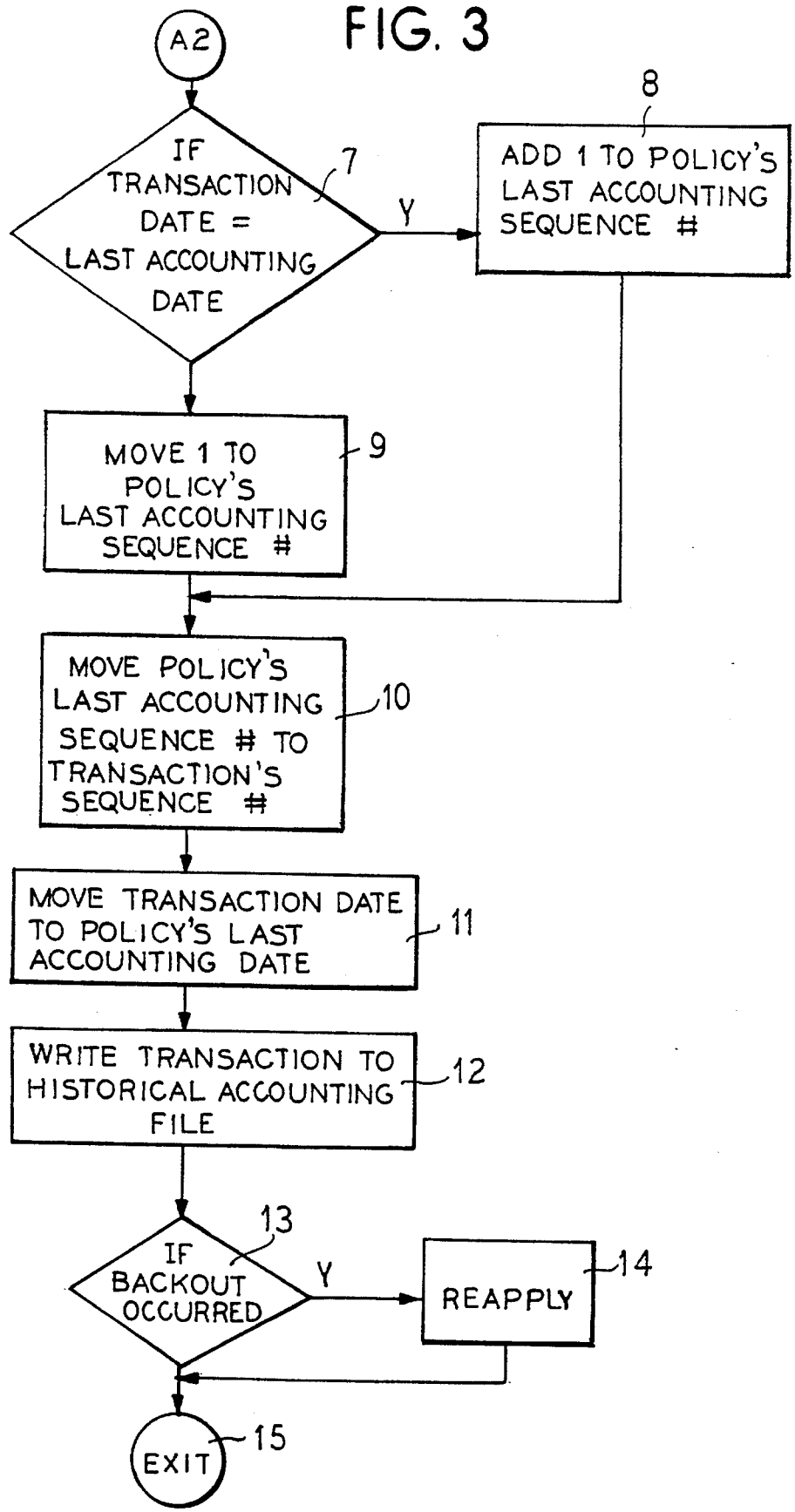
Figure 8:
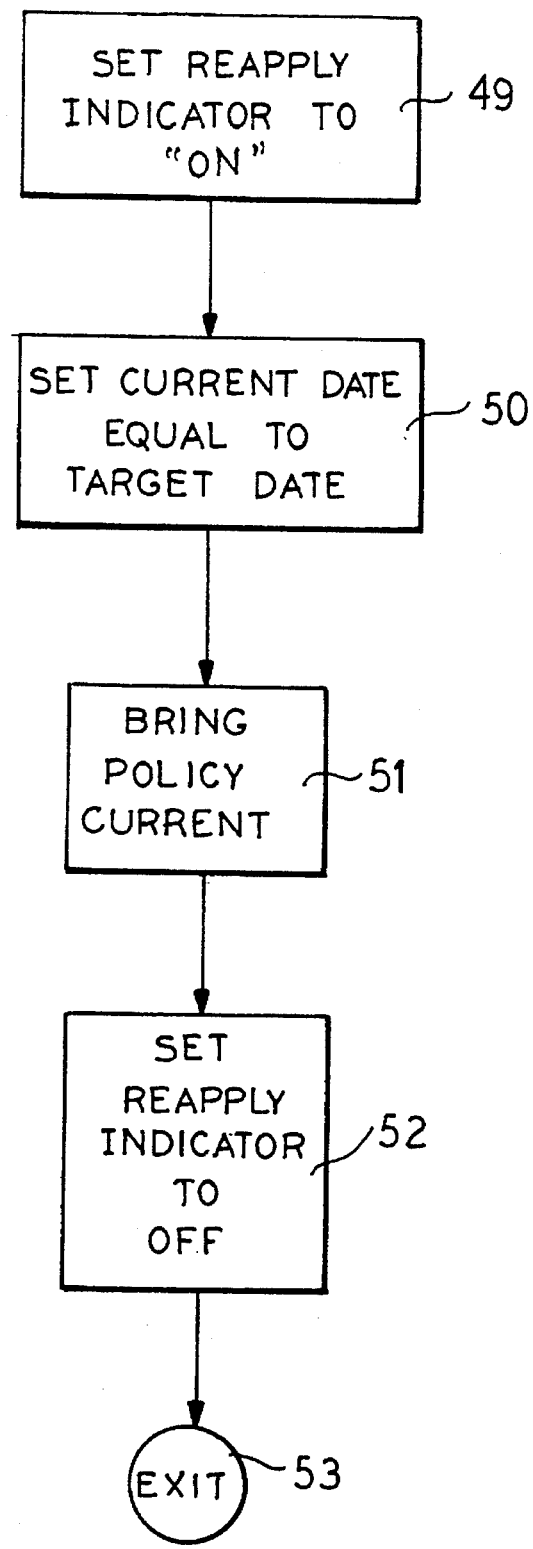
FIG. 8 is a flowchart presenting the presently preferred "reapply" subroutine of the preferred embodiment shown in FIGS. 2 and 3.

The final processing step sequence is to reapply all the previously backed out transactions which occurred between the effective date 120 and the target date 122 (see FIG. 3, block 14; FIG. 8). The program sets a current date equal to the target date (see FIG. 8, block 50) and then brings the policy to the current date (see FIGS. 5 and 6, Blocks 27–31, 36–40, 41). Thus, a corrected image of the policy is created which then serves as the working record image of the file.

In addition, the companion historical file may now contain three transactions for each retroactive transaction which occurred. The first transaction is the original transaction which appeared in the companion historical file. The second transaction is the same as the original but with the arithmetic signs reversed, thus negating the first transaction. The third transaction is the reapplied transaction which takes into account the correctly entered retroactive transactional change.

For a transaction such as a premium payment which covers a premium period which overlaps the effective date, the new invention program splits and thereby prorates that transaction into two portions. One portion which precedes the effective date is considered to be the earned portion and is entered in the establish subroutine. The other portion is considered to be unearned and occurs after the effective date. This latter portion is reapplied to the adjusted image in the reapply subroutine.

Transactional prorations of this character occur such as in adding a rider, prorating a premium, changing a contractual amount, entering a transactional change, determining the amount of a policy holder refund and the like. In general, every so-called traditional insurance policy could require a pro-rata splitting routine so therefore a usable file maintenance program must provide such a capability. The present invention modifies the prior "The Administrator" program so that it can achieve such a pro-rating capacity.

Those skilled in the art will appreciate that the foregoing illustration is exemplary only and that many different application situations can exist.

(b) Processing Steps and Computer Program for Accomplishing

Figure 2:
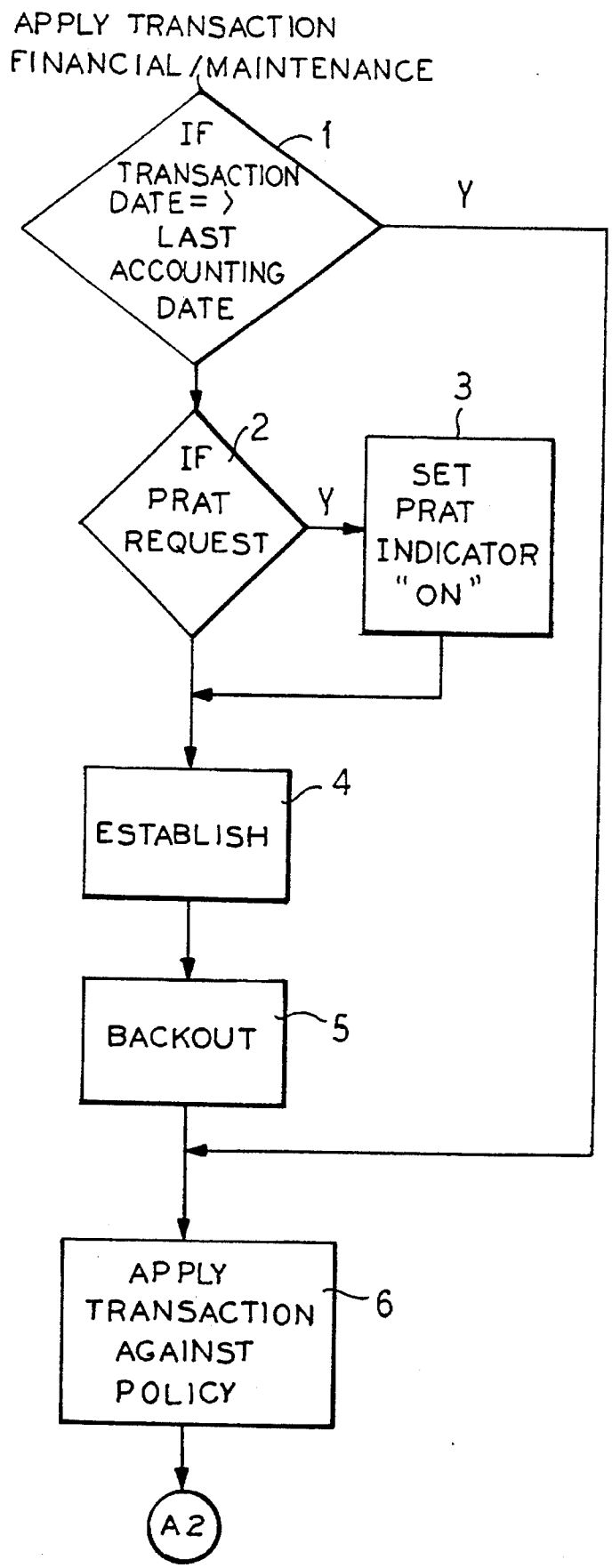
FIGS. 2 and 3 in combined form are a flowchart presenting a presently preferred embodiment of a computer program that is suitable for use in practicing the method of the present invention from FIG. 12.

Referring to FIG. 2, which is an illustration of a preferred embodiment of the invention, a flowchart shows a presently preferred computerized programmed process of inserting a transactional change into the file of one insurance policy. The file is one of a plurality of files, each file covering a different insurance policy. To apply (or insert) a transactional change, the computer system in block 1 functions to first determine if the transaction date of the transactional change is later than or the same as the last accounting date.

As used herein, the term "last accounting date" refers to the date, time and sequence number of the last financial transaction or the last maintenance transaction applied towards the policy which was stored in a historical accounting file. The term "sequence number" refers to the consecutive numbers that are automatically assigned to each transactional change that is entered into a file. The historical accounting file is a file which stores all financial activity and policy image file key information.

The term "effective date" or "transaction date" refers to the date, time and sequence number of a desired retroactive transactional change.

If a transaction date is later than, or is the same as, a last accounting date, then the transaction is simply applied to the policy as shown in block 6. In short, the desired transaction is not retroactive and is added to the policy.

If the transaction date is earlier than the last accounting date, the program next checks in block 2 to determine if a pro-rate (PRAT) request has been made. Such a request is operator input. If such a request has been made, the pro-rate (or prat) indicator is set to "on" in block 3.

After evaluating the status of the pro-rate request, then a policy image must be established in block 4 for the transaction date (as discussed below with regard to the establish subroutine described in connection with FIG. 4).

During a backout procedure, which is discussed below in connection with FIG. 7, and which is performed in connection with the establish subroutine in block 4, a backout occurred indicator is switched "on" to indicate that the transaction is in the nature of a retroactive transactional change to the policy.

As used herein, the term "backout occurred indicator" refers to an on/off program switch of a conventional type which is used to indicate whether or not a backout either has occurred (on) or has not occurred (off).

In an alternate embodiment, a transaction code preferably comprising four digits is associated with each transaction. The transaction code differs for each type of transaction. Thus, a premium payment has one code and a commission payment a second code.

All the transaction codes are arranged in a transaction table. The transaction code for a proposed transactional change can be checked against the transaction table to determine if the proposed transactional change is permitted. At this point, the transaction is then applied against either the policy image from the establish subroutine or the current policy if not a retroactive transactional change in block 6.

As seen in FIG. 3, the program then advances and the computer performs a check in block 7 to see if the transaction date is the same as the last accounting date. If, on the one hand, the two dates are not the same, then the last accounting sequence number is set equal to one (1) in block 9, indicating the first transaction of the last accounting date. If, on the one hand, the two dates are the same, then the digit one (1) is added to the last accounting sequence number in block 8. In both cases, the last sequence number of the policy is then moved to the transaction's sequence number in block 10, and the last accounting date is set equal to the transaction date in block 11. The transaction is written into the accounting file in block 12.

The backout occurred indicator is checked for status in block 13. If, on the one hand, the backout occurred indicator is off, then the program exits through block 15. The transaction has simply been added to the transaction table of the accounting file in the companion historical file in proper sequence.

If, on the other hand, the backout occurred indicator is on, then a reapply subroutine must be performed in block 14 and as described below in connection with the FIG. 8. The reapply subroutine is the final step needed to complete entry of a retroactive transactional change into a file before again exiting in block 15.

FIG. 4 details the establish policy subroutine (shown in block 4 of FIG. 2).

As used herein, the term "establish" refers to a process whereby an image of the policy file is created as that policy file existed at a given (selected) point in time.

The term "established image" refers to the image which is output from the establish subroutine.

The program first sets a target date to the later of either the file processed date or the last accounting date in block 16.

The term "target date" refers to the date and time that system processing is to stop a given process routine executing on a particular file that is employed in the practice of the present invention.

The term "processed date" refers to the last modal processing which occurred in the policy. Modal processing refers to standard interval cycle activity such as the posting of interest or the deduction of insurance costs. It is a feature of the present invention that, if desired, the program can be set for a date (the target date) which is before the present date but after the effective date.

If, for example, the policy has been suspended, then the target date is the date of policy suspension. The key date is set to the corresponding last save date in block 17. The key date is the date, time and sequence number which together with the policy number allow retrieval of the policy image file in block 18.

If, on the one hand, the key date is earlier than, or equal to, the transaction date in block 17, then the program process proceeds to set the current date equal to the transaction date in block 21 and the bring policy current subroutine of FIGS. 5 and 6 is executed in block 21 before exiting in block 22.

However, if, on the other hand, the key date is later than the transaction date, then the key date is compared to the last save date of the policy image file in block 23. The last save date of any policy image is always saved on the next subsequent policy image.

If the key date is earlier than, or equal to, the last save date of the relevant earliest policy image, then an error message is generated in block 24. This message informs the operator that the transactional change precedes the earliest policy image. Such an error could occur through operator error, or if the transaction date were to precede the conversion date on a converted policy.

If, on the other hand, the key date is later than the last save date saved in the policy image, then the last save date of the policy image is changed to the key date in block 26 and the program sequence loops back to block 18. The purpose of this loop is to find and retrieve the policy image which immediately precedes the transaction date of the desired retroactive transactional change.

The bring policy current subroutine is illustrated in FIGS. 5 and 6. In block 27, a reversal count is set to zero and in block 28, the historical file accounting key is preset to the point in time that the bring policy current subroutine is to start. From that key forward in time, the next record in the historical accounting file is accessed.

In block 30, the program checks to see if the transaction file date of the next record is later than the current date. If it is, the program exits in block 31 as the file is now current.

In block 32, the program checks to see if retrieved record is a reversal transaction. If it is, one is added to the reversal count in block 33. The system will then cycle back to block 29.

The loop which begins at block 34 if a reversal count is found to be greater than zero which would occur if the prior retrieved record was a reversal transaction. Block 35 resets the reversal count to zero and then cycles back to block 29.

The two loops which begin at blocks 32 and 34 respectively are used to filter reversal transactions and the original transactions which were reversed. Since the reversal transaction acts to negate its original transaction, use of the tow filter loops is made to save calculation steps.

The program next checks in block 36 on FIG. 6 to see if the auto extract date is earlier than the transaction file date. If so, then the cycle date is set to the auto extract date in block 37 and the policy is cycled in block 38. The cycle subroutine is best described in connection with FIGS. 9 and 10 below.

Next the PRAT indicator is checked in block 40 to see if the transaction is to be pro-rated. If it is, the check for premium subroutine is in block 40. The check for premium subroutine is best described in connection with the discussions below relating to FIG. 13.

In block 41, the transaction from the historical accounting file record is applied and the system loops back to block 29 to get the next record. The loop will also continue until the condition in block 30 is satisfied.

The flowchart of the backout subroutine is shown in FIGS. 5, 6 and 7. First, in block 42, the established image is saved (i.e., recorded) and the backout indicator is set to "on" as in block 43.

As used herein, the term "backout indicator" refers to a conventional on/off program switch which functions to indicate whether or not a backout is presently occurring. The backout indicator also acts automatically in the program to reverse all arithmetic signs during the bring policy current subroutine (block 45).

In block 44, the current date is then set to the target date. The use of the target date instead of the current date is the method whereby the current system handles suspension and the like. The prior system utilized the current date only which potentially resulted in backing out items which never occurred.

For example, if a policy was suspended on October 15 yet a retroactive transactional change was made on November 15 to be effective June 15, the prior method would backout all transactions scheduled to occur between June 15 and November 15. The use of the target date allows the backout to stop when it reaches October 15. The policy is then brought current in block 45 as described above in connection with the bring policy current subroutine shown in FIGS. 5 and 6.

The result of this reverse sign backout subroutine in which all arithmetic signs are reversed is to eliminate all transactions which occurred between the date and the target date. Thus, the policy file is established as of the date of the retroactive transactional change and the policy record (as shown in the image) is ready for the subsequent sequence of the apply and reapply subroutines.

The backout indicator is then set to off in block 46 and the image thus produced is treated as if it were the policy itself as shown in block 47. The backout subroutine then exits in block 48.

Turning now to FIG. 8, a flowchart of the reapply subroutine is presented. Initially, in block 49, a reapply indicator is set to on. As used herein, the term "reapply indicator" refers to an on/off switch of a conventional type to indicate whether or not a reapply is presently occurring (on) or is not occurring (off).

In block 50, the current date is set equal to the target date and the policy image is brought current in block 51 as described in relation to the bring policy current subroutine of FIGS. 5 and 6. In block 52, the reapply indicator is set to "off" and the subroutine exits in block 53.

The reapply subroutine program cycles the policy forward from the date to the target date to place the file in the form that it would have been in had the retroactive transactional change been initially entered in a timely fashion.

Figure 9:
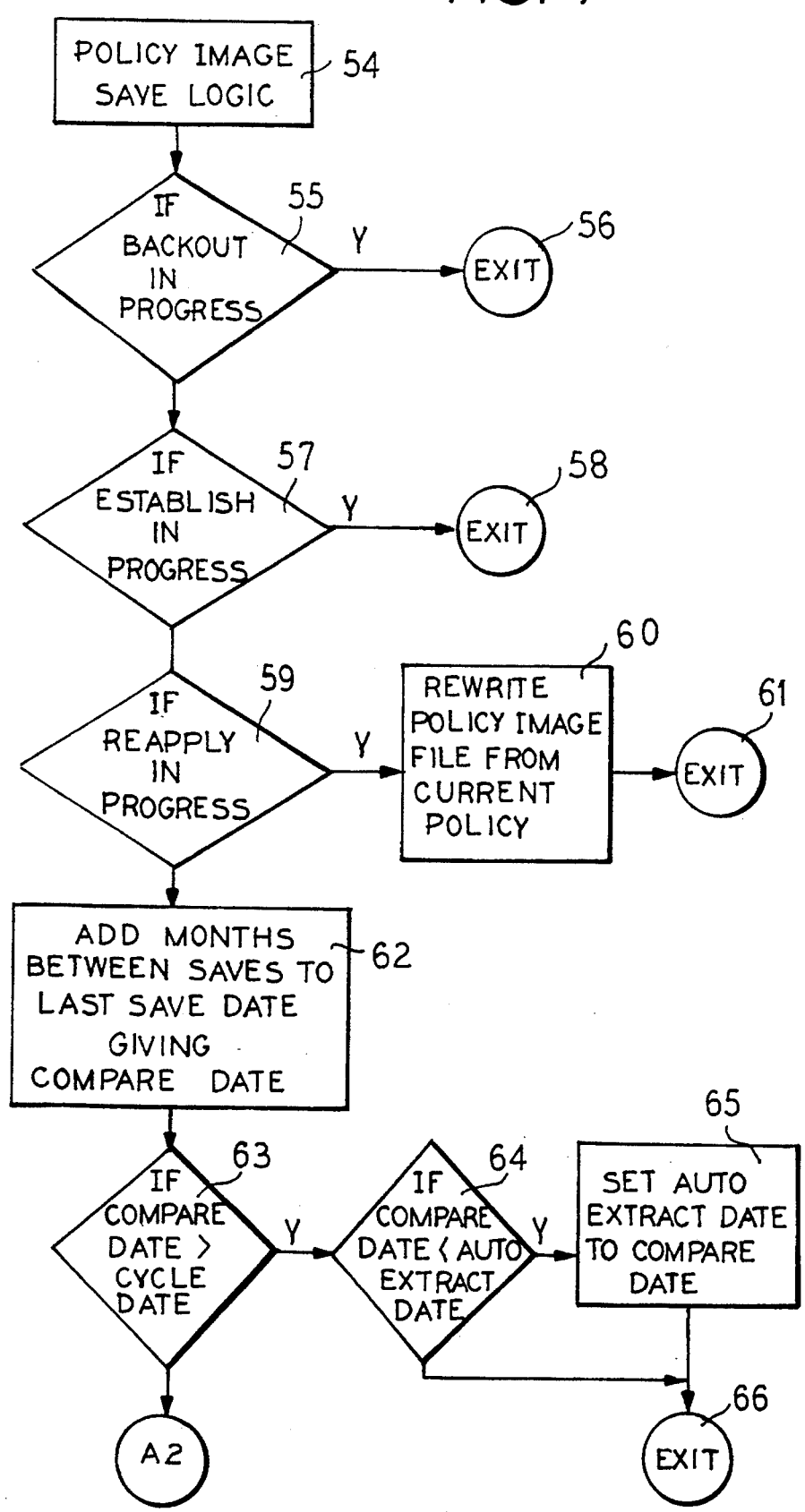
FIGS. 9 and 10 in combined form are a flowchart presenting the presently preferred "cycle" subroutine of the preferred program embodiment shown in FIGS. 5 and 6.
Figure 10:
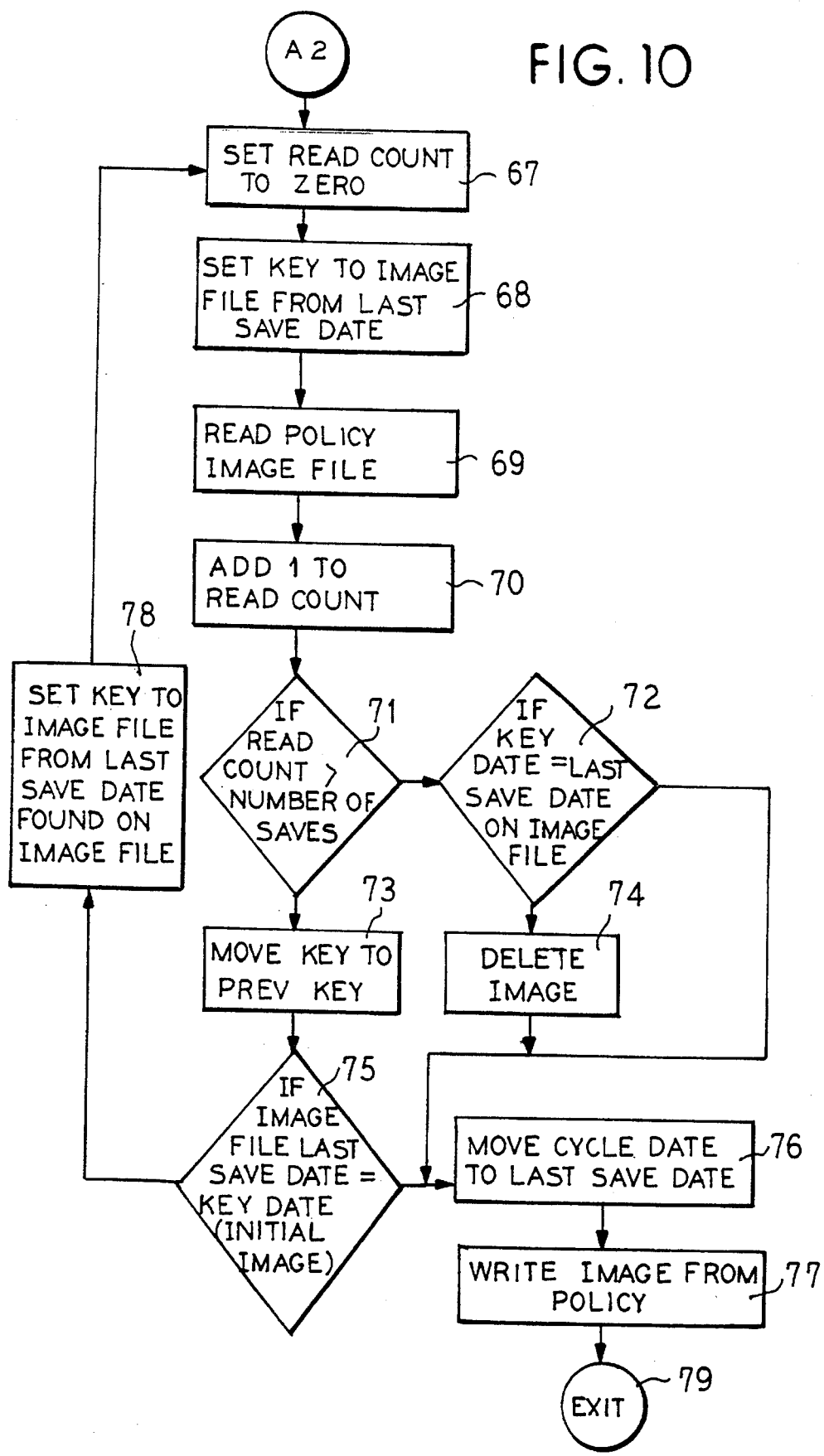

Turning now to FIGS. 9 and 10, to accomplish the cycle subroutine, the program first executes the policy image save logic in block 54. The save logic comprises the automatic operations many of which are user-scheduled to occur on the auto extract date.

As used herein, the term "cycle" or "cycling" or equivalent refers to the processing of an insurance policy file on a specific target date. A cycle includes the normal programmed events required to administer an insurance or annuity policy as shown in the file on that policy. Examples of cycle activity include the saving of the periodic images, premium notices, commission payments and the like. A cycle for a policy is executed sequentially from a given start date to an ever later target date.

The term "cycle date" refers to the date and associated time that are fed into a cycle and that identify where the file is in the life of the policy.

Next, in blocks 55 and 57, the program determines whether or not a backout subroutine or an establish subroutine is in process. If so, then the cycle subroutine is exited in block 56 and 58, respectively.

In block 54, the subroutine checks to see if a reapply is in progress. If so, in block 60, the policy image file is rewritten from the current policy before exiting in block 61.

However, if no subroutines are in process, then the user-determined months (or other time intervals) between policy image saves are added to the last save date which determines the compare date in block 62. As used herein, the term "compare date" refers to the date and time that the next policy image is scheduled to be saved. If the compare date is earlier than, or equal to, the cycle date in block 63, then the subroutine advances onto the subroutine blocks shown in FIG. 10.

If the compare date is later than the cycle date, then the compare date is next checked to see if this date is earlier than the next auto extract date in block 64. If the compare date is later than the auto extract date, then the subroutine is exited. If, however, the compare date is earlier than the next auto extract date, then the auto extract date is set to the compare date in block 65 before exiting in block 66. The resetting of the auto extract date allows the cycle subroutine to execute a cycle before saving the next policy image.

In the portion of the subroutine shown in FIG. 10, block 67 indicates the location where a read count is initially set to zero.

As used herein, the term "read count" refers to a calculated number used to determine when the number of policy images to be saved is reached. When the user selected number of policy images to be saved is reached, then an old policy image must be deleted before a new policy image is saved.

Next, in block 68, the key date for the policy image is set to the last save date. The policy image is then read in block 69 and the digit one (1) is added to the read count in block 70. These steps create a new policy image.

If the read count is not greater than the number of the policy images to be saved in block 71, then the key is moved to the previous key in block 73.

As used herein, the term "key" refers to the portion of a record which is fixed and which makes the record unique. The policy number is typically used as part of the key.

If, on the one hand, the policy image last save date equals the key date of the policy image in block 75, then the cycle date is changed to the last save date in block 76, the policy image is written from the working record image in block 77 and the cycle subroutine is exited in block 79. If, on the other hand, the policy image last save date does not equal the key date, then the program sets the key to the policy image last save date in block 78 and loops back to block 68. This last indicated loop counts the number of policy images previously saved until either the initial policy image is found in block 75, or the read count exceeds the user-selected number of image saves in block 71.

If the read count in block 71 is greater than the number of image saves, and if the key date equals the last save date on the policy image in block 72, then the program moves the cycle date to the last save date in block 76, writes the image of the policy in block 77, and then exits the subroutine in block 79. If, however, the key date does not equal the last save date, then the program deletes a policy image in block 74 before proceeding to block 76. The delete subroutine is best described below in connection with the discussion relating to FIG. 11.

Figure 11:
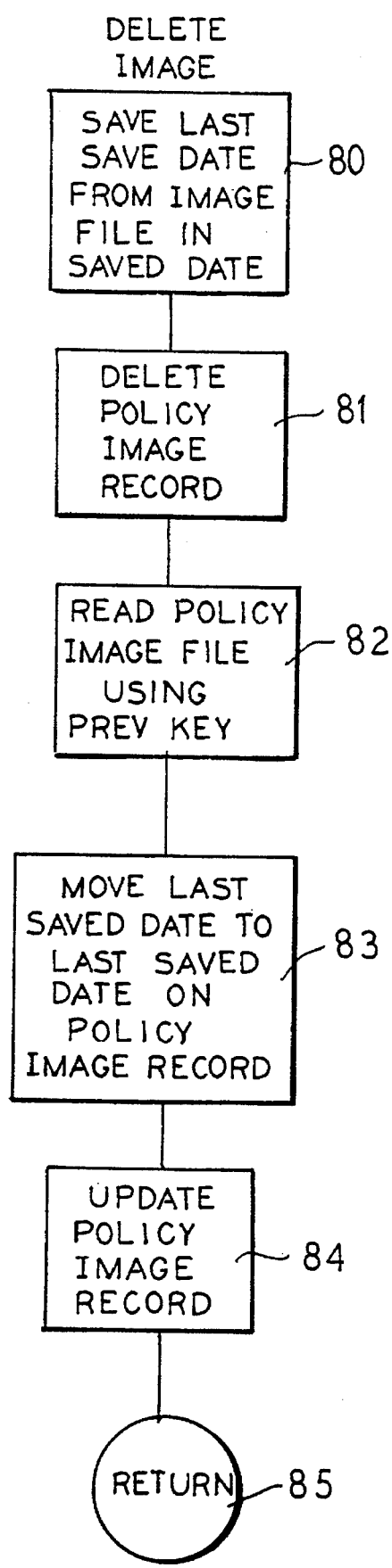
FIG. 11 is a flowchart presenting the preferred "delete image" subroutine of the preferred embodiment shown in FIGS. 9 and 10.

The subroutine whose flowchart is shown in FIG. 11 functions to delete excess policy images. In operation, the last save date from the policy image is saved in block 80.

The policy image is deleted in block 81. The next policy image file is read using the previous key in block 82. The saved last date is moved to the last save date of the policy image in block 83. The policy image is updated in block 84 and the subroutine exits in block 85.

Figure 12:
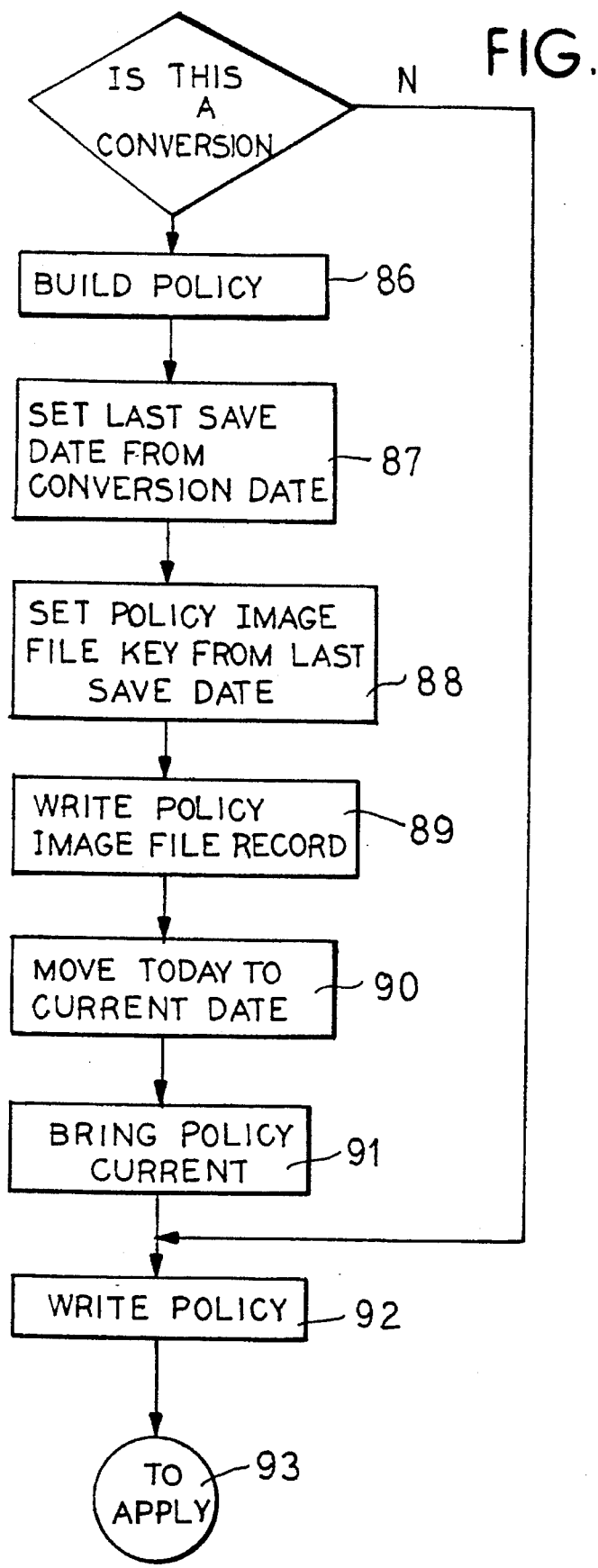
FIG. 12 is a flowchart presenting the preferred "conversion" program of the preferred program embodiment.

FIG. 12 shows the conversion subroutine that is employed to convert a policy file from another (previous) system into the system where the present invention is being practiced. The term "conversion", "converting" or equivalent refers to the act of transferring a policy file from another administrative system into the file system employed in the practice of the present invention.

In addition, the term "conversion date" refers to the date and time that a policy file was transferred from another administrative system into the file system that is employed in the practice of the present invention.

First, the system determines if the policy to be converted is an existing policy from another administrative system or if it is a new policy. If a new policy, the program simply proceeds to block 92 to write the policy. If the policy is a conversion, then a policy file is built in which all parameters of the policy are consistent with the user-selected conversion date in block 86. Then, the last save date is set from the conversion date in block 87. The policy image key is set from the last save date in block 88.

The policy image is then written in block 89. The current date is set to today in block 90 and the bring policy current subroutine is executed in block 91. After that, the resulting policy, or working record image, is written in block 92.

After the policy is written, then any further transactions are handled via the preferred embodiment as exemplified in FIGS. 2 and 3.

The present method differs from the prior system in that the conversion date can be used as the key date on the first policy image record. The prior method required the use of the policy issue date or contract inception date as the key date. The modification has greatly reduced the effort and cost required to convert to the "Administrator".

Figure 13:
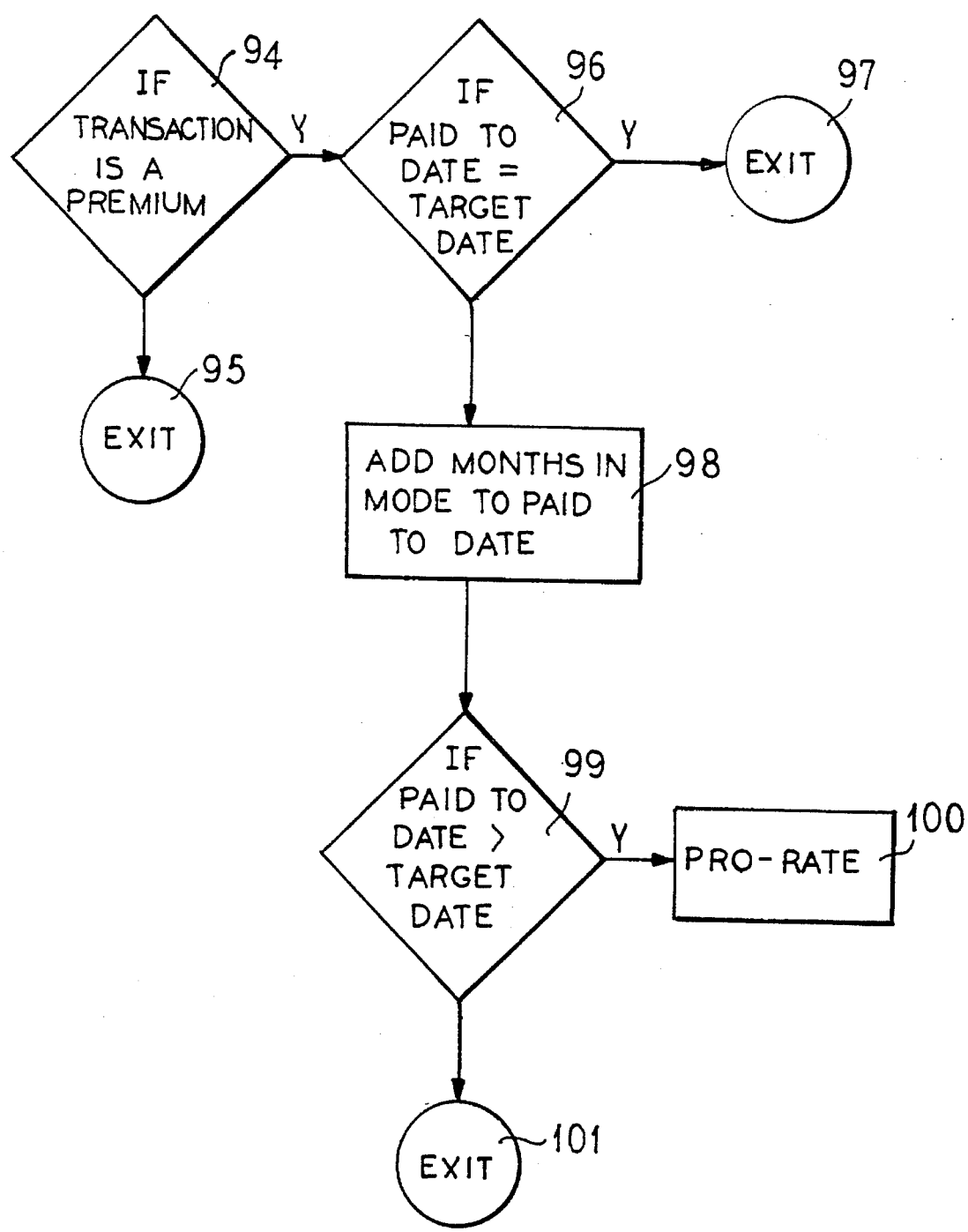
FIG. 13 is a flowchart presenting the preferred "check for premium" subroutine of the preferred program embodiment shown in FIGS. 5 and 6.

The check for premium subroutine is detailed in FIG. 13. The subroutine initially checks to see if the transaction is a premium (block 94). If not, the subroutine exits in block 95. The subroutine also checks to see if the policy paid to date is equal to the target date in block 96. If so, then the program exits in block 97 as no premium is due.

Figure 14:
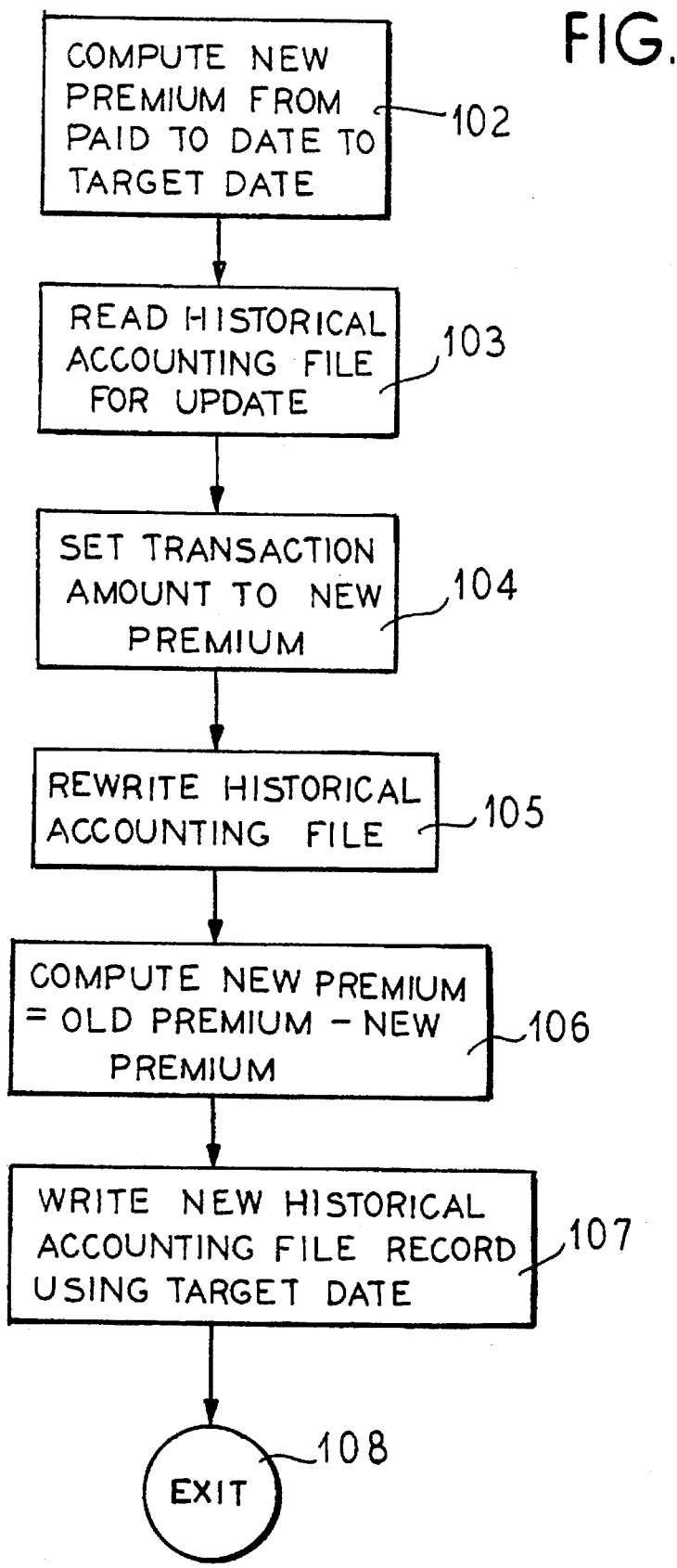
FIG. 14 is a flowchart presenting the preferred "pro-rate" subroutine of the preferred program embodiment shown in FIG. 13.

The months in mode is then added to the paid to date in block 98. If paid to date is now later than the target date in block 99, then the pro-rate subroutine best described in FIG. 14 is executed in block 100. If the paid to date is earlier than the target date, the subroutine exits via block 101.

The pro-rate subroutine is seen in FIG. 14. A new premium is computed to cover the time period from the paid to date to the target date in block 102. Next, in block 103, historical accounting file is read to update.

The transaction amount is set to the previously computed new premium in block 104, and the historical accounting file is rewritten in block 105. The new premium number is re-computed in block 106 to be the prior premium minus the new premium from block 102. A new historical accounting file is then written using the target date in block 107 and the subroutine exits in block 108.

(c) Embodiments

The following examples further illustrate the present invention:

EXAMPLE 1

Retroactive Transactional Change to A Target Date

The following is an example of how the inventive processing takes place for entering a retroactive transactional change into an image of a policy file of a policy contract has been suspended. This example concerns a policy that is three years old with a premium increase that was processed six months ago. An error had occurred during the application of this increase and the error was not detected until the present date. The following are the process sequences that the system executes in order to accomplish entry of the correcting retroactive transactional change using the present invention.

In the present computerized file record maintenance system, a plurality of images are recorded for the policy file, each image recordation being at a successive spaced time interval relative to the other images (FIG. 6, Blocks 36–38; FIG. 9). Each image contains all information relating to the status of the file as of the date of its recordation (FIG. 9, Block 54). The file also has a companion historical file containing recorded data pertaining to the file (FIGS. 2 and 3, Blocks 1, 6, 7–12).

The first step is to retrieve the current version of the policy in image form. The system is then requested by the operator to return the image to the effective date of six months ago (FIG. 2, Block 4). The system retrieves that particular image of the file which immediately precedes the requested effective date of the retroactive transactional change (FIG. 4, Blocks 16–19, 23, 26).

The system accesses a companion historical file of accounting records including maintenance transactions and financial transactions relating to the file (FIG. 4, Block 21; FIG. 5, Blocks 27–29). The system then enters all transactions from the companion historical file utilizing the system forward processing sequence for the transactions extending from the recordation time of the retrieved image to the effective date (FIGS. 5 and 6, Blocks 29–31, 36–49, 41). This processing is in a normal mode without changing the signs on the transactions. The resulting image establishes or represents the file status as of the effective date.

When the system reaches the effective date, the resultant image so produced is internally stored in memory for further use.

The system then continues to forward process the policy to the target or suspension date (FIG. 2, Block 5; FIG. 7). This processing uses the same historical companion files mentioned above but backs out by reversing all arithmetic signs for all intervening transactional changes (see FIG. 7, Block 45; FIG. 6, Blocks 124, 126).

The system then retrieves the saved resulting image (FIG. 7, Block 47) which correctly reflects a policy file status having the effective date as its current date.

At this time, the system applies the transactional change to the resultant image, thereby producing an adjusted image (FIG. 2, Block 6). The system reapplies to the adjusted image the intervening transactional changes which have been removed (backed out) using the current forward arithmetic sign (FIG. 3, Block 14; FIG. 8; FIGS. 5 and 6), thereby producing a corrected image which fully incorporates the retroactive transactional change into the file. The corrected policy which results is the new working record image of the policy.

EXAMPLE 2

Retroactive Transactional Change with Pro-Rated Processing

The following is an example of how the inventive processing takes place for entering a retroactive transactional change into a policy file of a policy contract which is currently suspended. This example concerns a policy that is three years old with a premium increase that was processed six months ago. An error had occurred during the application of this increase and the error was not detected until the present date. The following are the process sequences that the system executes in order to accomplish entry of the correcting retroactive transactional change on a pro-rated basis.

In the present computerized file record maintenance system, a plurality of images are recorded for the policy file, each image recordation being at a successive spaced time interval relative to the other images (FIG. 6, Blocks 36–38; FIG. 9). Each image contains all information relating to the status of the file as of the date of its recordation (FIG. 9, Block 54). The file also has a companion historical file containing recorded data pertaining to the file (FIGS. 2 and 3, Blocks 1, 6, 7–12).

The first step is to turn on the PRAT (or pro-rate) indicator on (FIG. 2, Blocks 2,3) and then retrieve the current version of the policy in image form. The system is then requested by the operator to return the image to the effective date of six months ago (FIG. 2, Block 4). The system retrieves that particular image of the file which immediately precedes the requested effective date of the retroactive transactional change (FIG. 4, Blocks 16–19, 23, 26).

The system accesses a companion historical file of accounting records including maintenance transactions and financial transactions relating to the file (FIG. 4, Block 21; FIG. 5, Blocks 27–29). The system then enters all transactions from the companion historical file utilizing the system forward processing sequence for the transactions extending from the recordation time of the retrieved image to the effective date (FIGS. 5 and 6, Blocks 29–31, 36–41). This processing is in a normal mode without changing the signs on the transactions.

The system recalculates the last premium prior to the requested date and creates two new accounting transactions (FIG. 6, Blocks 39, 40; FIG. 13; FIG. 14). The first transaction pays the policy to the effective date (FIG. 14, Blocks 102–105) while the second transaction puts the remainder of the money in suspense (FIG. 14, Blocks 106, 107).

The resulting image establishes or represents the file status as of the effective date including the premium amount which is credited to this time period.

When the system reaches the effective date, a the resulting image is internally stored in memory for further use.

The system then continues to forward process (back out) the policy to the target or suspension date (FIG. 2, Block 5; FIG. 7). This processing uses the same historical companion files mentioned above but backs out by reversing all arithmetic signs for all intervening transactional changes (see FIG. 7, Block 45; FIG. 5, Blocks 124, 126). An intermediate image is thus produced.

The system then retrieves the saved resulting image (FIG. 7, Block 47) which correctly reflects a policy file status having the effective date as its current date.

At this time, the system applies the transactional change to the resultant image, thereby producing an adjusted image (FIG. 2, Block 6).

The system reapplies to the adjusted image the intervening transactional change which had been removed or backed out (FIG. 3, Block 14; FIG. 8; FIGS. 5 and 6). The system processes the policy one period at a time utilizing the companion historical file as well as the partial premium that had been put into suspense, thereby to chronologically restore the policy to the target date. The reapply process calculates all accounting transactions with their normal signs. A corrected image is produced which is recorded.

A part of the system develops billing suspense records to account for the difference in required premiums. These suspense records preferably appear as an adjustment to the next bill sent to the policy holder.

The image of the newly calculated policy is saved as the current policy master record (see FIG. 8) with the current (present) date.

Thus, target date retrieval and backout are conveniently accomplished using the backout routine. Also, one can achieve pro-ration of a relevant accounting transaction either in the entering (as in the establish subroutine) or in reapplying (as in the reapply subroutine).

The foregoing is illustrative of the principles of the invention. Further, since numerous modifications and changes will readily occur to those skilled in the art, it is not desired to limit the invention to the exact construction and operation shown and described. Accordingly, all suitable modifications and equivalents may be resorted to while still falling within the scope of the invention.

What is claimed is:

1. In a computerized file record maintenance system of the type where, for each individual one of a plurality of record files, a plurality of stored images are successively individually recorded, each said image being so recorded at a date which is spaced by a prechosen time interval from the other images of said plurality of stored images that comprise one said image plurality for a given one of said record files, and each stored image containing all information relating to the status of its file as of the date of its recordation, and each individual one of said record files also having a recorded associated companion historical file containing recorded accounting records pertaining to that individual record file, the improved method of entering a desired retroactive transactional change at its effective date into a prechosen individual one of said record files comprising the successive steps of:

a) retrieving from among said stored image plurality for said one record file that one image whose recordation date immediately precedes said effective date of said retroactive transactional change;

b) entering all accounting records relevant to said one record file into said one image from the associated companion historical file of said one record file which relevant accounting records occurred during a first time period extending between and including said effective date and said recordation date of said so retrieved one image, thereby to produce a resulting image which represents the status of said one record file as it existed at said effective date;

c) retrieving a selected target date, said target date being a date that occurs between and including the present date and up to said effective date;

d) backing out from said resulting image using reverse arithmetic signs all relevant transactional changes which previously occurred during a second time period extending between and including said effective date and said target date and which were previously interveningly entered into said associated companion historical file so that all said interveningly entered transactional changes are negated, thereby to produce an intermediate image;

e) applying to said intermediate image said desired retroactive transactional change using correct arithmetic signs, thereby to produce an adjusted image;

f) reapplying to said adjusted image all said so backed out interveningly entered transactional changes using correct mathematical signs, thereby to produce a corrected image which represents said one file and which fully incorporates said desired retroactive transactional change; and g) recording said corrected image as the working record image.

2. The method of claim 1 wherein, in said entering step, each of said relevant accounting transactions is divided into two separate accounting transactions, one said separate transaction covering the time period prior to said effective date, the other said separate transaction covering the time period after said effective date.

3. The method of claim 2 wherein, in addition, in said reapply step, each of said relevant accounting transactions is divided into two separate accounting transactions, one said separate transaction covering the time period prior to said effective date, the other said separate transaction covering the time period after said effective date.

4. The method of claim 2 where said pro-rating is performed on a daily basis thereby to provide quantitative daily information for accounting matters which vary on a daily basis.

5. The method of claim 1 wherein, in said reapply step, each of said relevant accounting transactions is divided into two separate accounting transactions, one said separate transaction covering the time period prior to said effective date, the other said separate transaction covering the time period after said effective date.

6. The method of claim 3 where said pro-rating is performed on a daily basis thereby to provide quantitative daily information for accounting matters which vary on a daily basis.

7. The method of claim 1 wherein said target date is selected manually.

8. The method of claim 1 wherein said target date is selected automatically based on manually input information about said desired retroactive transactional change.

9. The method of claim 1 wherein said one record file is initially converted from a record file that existed previously in a different file record maintenance system.

10. The method of claim 9 wherein said conversion is carried out by the steps of:

a) setting a last save date equal to the date of said conversion;

b) setting a policy image key date equal to said last save date;

c) writing said policy image as of said key date;

d) bringing said policy image current from said key date to the current date thereby to produce a resulting policy; and e) additionally writing said resulting policy thereby to produce a current image of said one record file.

11. The method of claim 1 wherein each file relates to an insurance policy.

12. The method of claim 1 wherein said one record file is a suspended insurance policy.

13. The method of claim 1 wherein the steps of entering transactional changes, backing out intervening transactional changes and reapplying intervening transactional changes from the historical companion file is executed by a single subroutine.

\* \* \* \* \*